United States Patent
Matsui et al.

(10) Patent No.: US 6,260,122 B1
(45) Date of Patent: Jul. 10, 2001

(54) MEMORY DEVICE

(75) Inventors: Masaru Matsui; Fumiaki Nagao, both of Gifu (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/235,842

(22) Filed: Jan. 22, 1999

(30) Foreign Application Priority Data

Jan. 29, 1998 (JP) .................................................. 10-016931

(51) Int. Cl.⁷ ...................................................... G06F 12/00
(52) U.S. Cl. .......................... 711/157; 711/127; 711/163; 711/165; 711/167; 711/170; 711/173
(58) Field of Search ................................ 711/5, 127, 128, 711/157, 165, 170, 108, 172, 173, 167; 714/701

(56) References Cited

U.S. PATENT DOCUMENTS

| | | | |
|---|---|---|---|
| 5,295,252 | * 3/1994 | Torri et al. ............................. | 711/127 |
| 5,537,577 | * 7/1996 | Sugimura et al. .................... | 711/157 |
| 5,689,680 | * 11/1997 | Whittaker et al. ................... | 711/127 |
| 5,761,695 | * 6/1998 | Maeda et al. .............................. | 711/5 |
| 5,761,714 | * 6/1998 | Liu et al. ............................... | 711/127 |
| 5,761,732 | * 6/1998 | Shaberman et al. ................. | 711/157 |
| 5,805,855 | * 9/1998 | Liu ........................................ | 711/108 |
| 5,828,671 | * 10/1998 | Vela et al. ............................ | 714/701 |
| 5,924,117 | * 7/1999 | Luick .................................... | 711/127 |
| 5,960,462 | * 9/1999 | Solomon et al. .................... | 711/172 |
| 6,049,855 | * 4/2000 | Jeddeloh .............................. | 711/157 |

* cited by examiner

*Primary Examiner*—Matthew Kim
*Assistant Examiner*—Fred F. Tzeng
(74) *Attorney, Agent, or Firm*—Cantor Colburn LLP

(57) ABSTRACT

Nine memories (10a~10i) are provided, out of which five memories are made memories for the present processing. Meanwhile, the remaining four memories are made memories for receiving and storing data to be inputted during the processing. Then, the memories (10a~10i) which have accepted input data to be inputted at each duration of 1 sound group (SG) are switched to be used for processing, and the memories (10a~10i) which have been for processing are switched to be used for receiving input data, but a memory (10a~10i) which has stored the latest data in the memories for processing is left for processing. With this arrangement, memory capacity can be reduced.

3 Claims, 2 Drawing Sheets

MEMORY DEVICE

BACKGROUND OF THE INVENTION

1. Technical Field of the Invention

Figure 1:
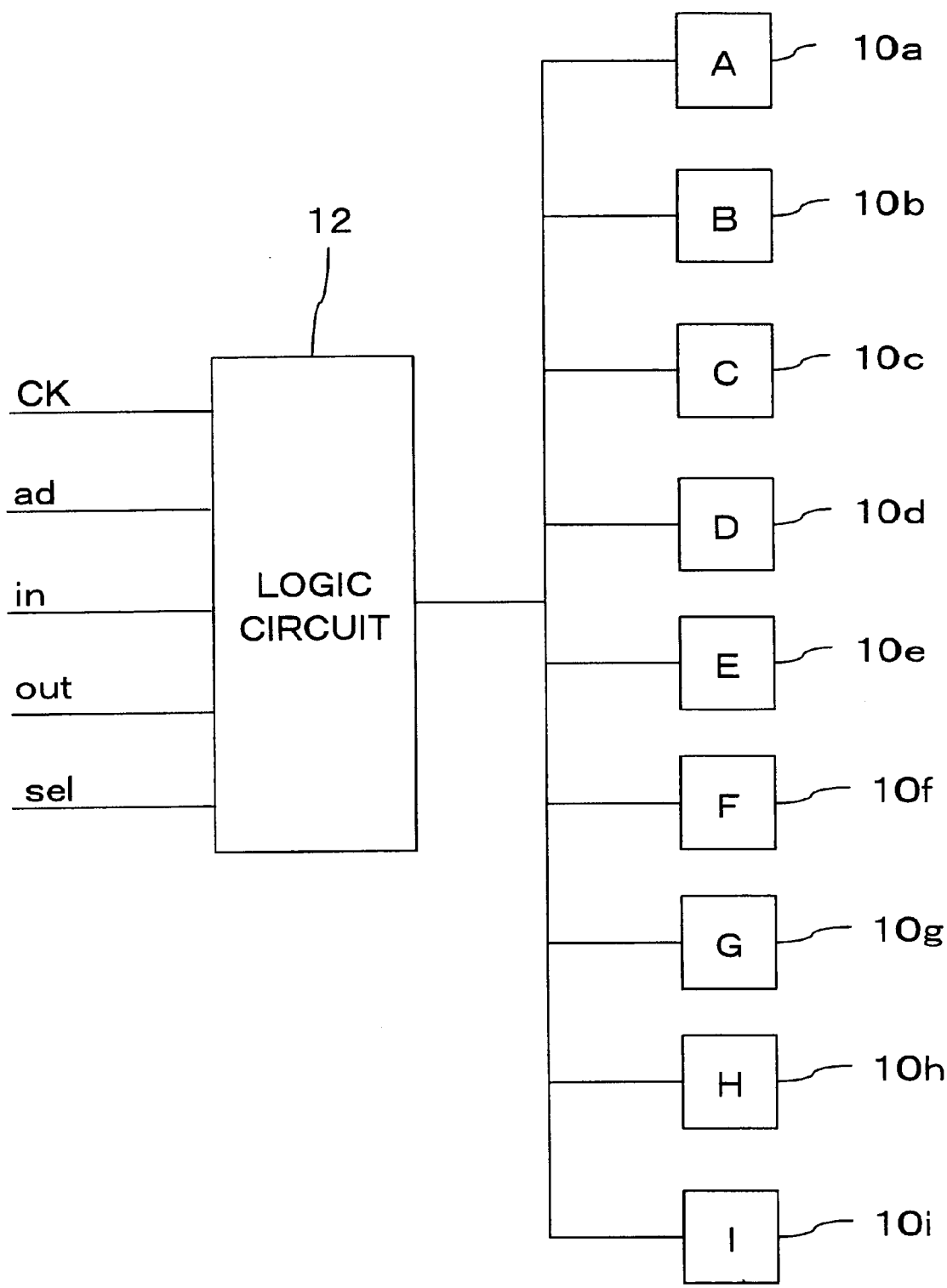

The present invention generally relates to a memory device into which data from the preceding stage is written and from which data is read depending on the processing status of the subsequent stage, and more particularly to a memory device of which a required memory capacity is split into a plurality of split memories for use in processing.

2. Description of the Related Art

Conventionally, encoding and compressing processing have been performed in recording and transmitting of audio data or image data, and decompressing and decoding processing have been performed in reproducing and receiving.

For example, in recording an audio signal in an MD (minidisc), the audio signal is first converted into digital delta (A/D conversion), and in turn the digital data is split into three bands (frequency bands) comprising a low, an intermediate, and a high band by a digital filter called a QMF (Quadrature Mirror Filter), and subjected to MDCT (Modified Discrete Cosine Transform) processing, quantization processing, and the like, and the resultant data is written into the MD. Accordingly, reproduction of such data involves reverse processing such as dequantization, IMDCT (Inverse MDCT) processing, inverse filtering processing by IQMF (Inverse QMF), D/A conversion, and the like.

When performing such processing, a memory is required to store the data being processed in the process of the processing. For example, when the MDCT processing is performed, data fed from the QMF at the preceding stage is processed, wherein L channel data and R channel data are alternately fed from the QFM in time series. On the other hand, in the MDCT processing, the L channel data and the R channel data are separately processed.

Accordingly, data required for the processing is kept stored, and at the stage when the data to be processed is all available, the processing is started. Thus, the processing requires a memory for storing the data to be processed and for storing the data inputted thereto while the processing is being performed. Further, calculations associated with the MDCT involve recursive operations, thus also requiring a memory for storing data being processed.

For the MDCT processing, a large quantity of data is to be stored as mentioned above, causing a problem that a large capacity memory (generally SRAM) is required.

Besides, in the MDCT, data is split into SGs (Sound Group) each having a period of 11.6 msec for processing. At a boundary of two SGs, data is used overlapped to a degree by both SGs. Therefore, the overlapped data is used in the MDCT relating to the two SGs. For this reason, the data used twice must be prevented from being overwritten by the following data.

SUMMARY OF THE INVENTION

It is an object of the present invention to provide a memory device which is capable of efficient processing.

The present invention is directed to a memory device in which memory capacity required for processing a predetermined quantity of data is split into a plurality of split memories for use in the processing, wherein the plurality of the above mentioned split memories is composed of a first memory group storing data to be processed during a predetermined processing duration and a second memory group for being written into and storing data being inputted in the course of the processing duration, and the first memory group and the second memory group are alternately switched at a time point where the predetermined processing duration has passed excepting at least one of the split memories. As roles of memories are switched in this way leaving a part thereof intact, input data can be received while data to be used for processing can efficiently be held. Accordingly, processing with reduced memory capacity is made possible.

In a preferred aspect of the present invention, the above mentioned first group is allocated a larger number of the split memories than the above mentioned second group.

In another preferred aspect, the at least one split memory of the above mentioned first memory group continuously hold data even after the predetermined processing duration has passed.

BRIEF DESCRIPTION OF THE DRWAINGS

Figure 2:
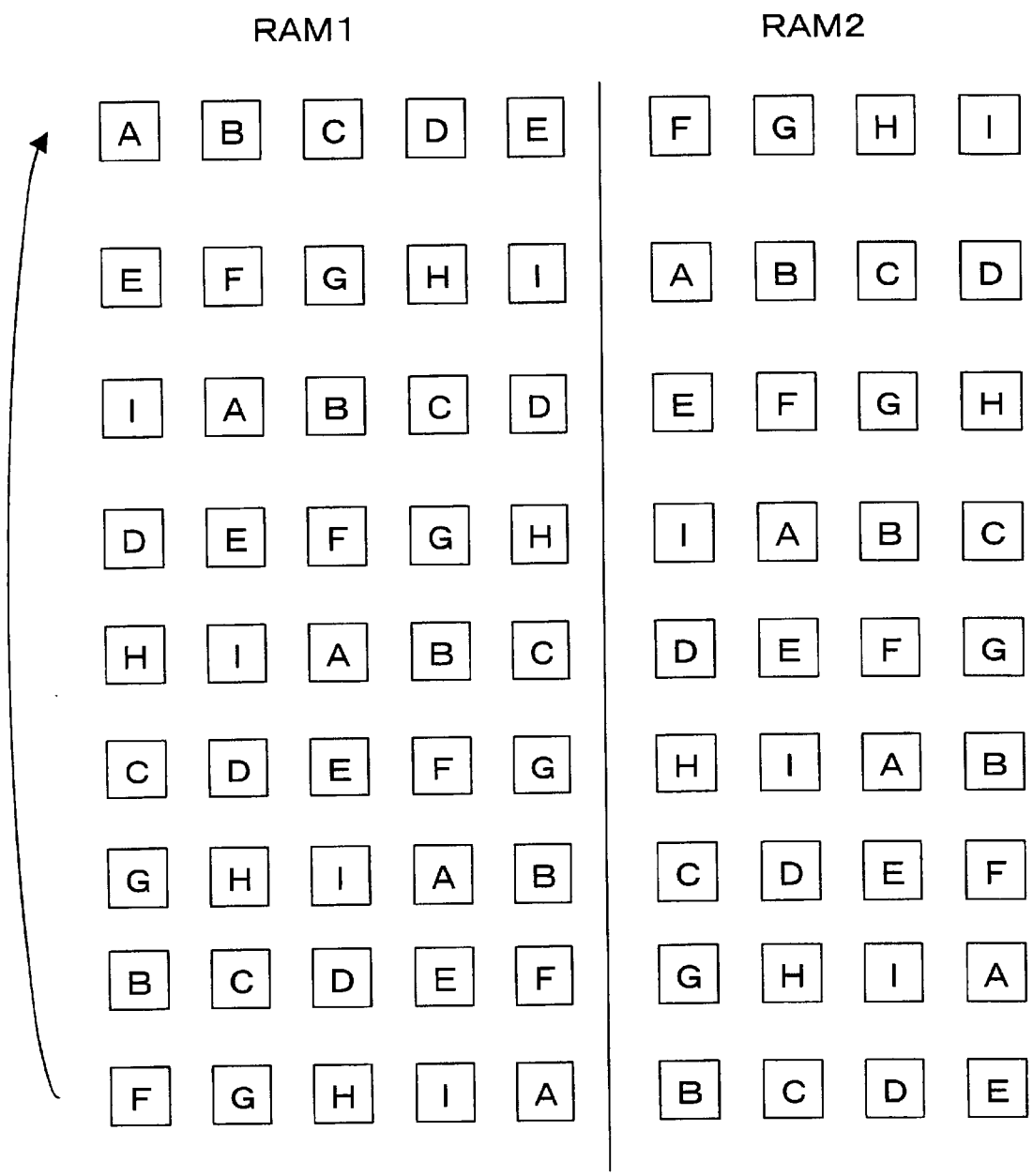

FIG. 1 is a diagram showing a configuration of an embodiment of the present invention; and FIG. 2 is a diagram showing a switching state of memories.

DESCRIPTION OF PREFERRED EMBODIMENT

An embodiment of the present invention (hereinafter referred to as embodiment) will be described hereunder with reference to drawings.

FIG. 1 is a diagram showing a configuration of a memory device according to the present embodiment, wherein the memory device has nine memories 10a~10i each having a capacity of 256 words. To the memories 10a~10i, signals are inputted and outputted via a logic circuit 12. Namely, five lines are connected to the logic circuit 12, these being a clock signal CK, an address signal ad, an input data in, an output data out, and a select signal sel. Further, signal lines from the logic circuit 12, namely a clock signal CK, an address signal ad, an input data in, or an output data out, are connected with respective memories 10a~10i.

Here, the select signal sel is a signal to indicate which one of the memories 10a~10i is to be accessed, and corresponds to a higher bit of the memory address. Then, the clock signal CK and the address signal ad are fed to one memory designated by the select signal sel out of the memories 10a~10i, and input data in is written thereinto or output data out is outputted therefrom. In the meantime, whether to write data in or to read data out is controlled by a write enable signal and a read enable signal fed as control signals to respective memories 10a~10i.

Then, data is written into or read out from a specific address of any one of the memories 10a~10i designated by the select signal sel and address signal ad.

In the meantime, respective memories 10a~10i are composed of 256 words (1 word: 26 bits, totally 2304 words). A memory address is, for example, 0~2303. The higher four bits are made the select signal and the lower eight bits are made the address signal.

The memory device according to the present embodiment is used for MDCT processing at the time of data recording into an MD. Output from a QMF is stored in memories 10a~10i and data read out therefrom is subjected to the MDCT processing. Data generated during the MDCT processing and the data processed thereby are also stored in the memories 10a~10i.

Then, the QMF alternately outputs in time series L channel data and R channel data. The MDCT calculates the L channel data and the R channel data separately in terms of each 1SG. The 1SG is composed of 512 samples respectively of both the L channel and the R channel. Accordingly, data composed of 1024 samples are outputted from the QMF in 1SG duration.

Meanwhile, in the MDCT, processing is performed at the boundary of SGs with data overlapped to a degree. Namely, in the respective L and R channels, data of 512 samples in a 1SG duration is added to data of 96 samples of the preceding duration to make data to be processed.

Memories which store data of (512+96)×2 samples to be processed in a 1SG duration and store data during the calculation processing as well are represented as a first memory group RAM1, and memories which store data of 512×2 samples to be inputted during the calculation duration are represented as a second memory group RAM2. In this case, in the present embodiment, the memories 10a~10i are alternately switched between the RAM1 and the RAM2 at each SG to be used for processing.

More particularly, when respective nine memories of 10a~10i are represented by memories A~I, memories A~E are used as the RAM1 and memories F~I are used as the RAM2 in the first SG, as illustrated in FIG. 2. In the next SG, four memories are shifted to use the memories E~I as RAM1 and the memories A~D as RAM2. Here, only the memory E is used intact as the RAM1. Further, in the following SG, further four memories are shifted to use memories I and A~D as RAM1, and memories E~H as RAM2. In this way, the RAM which stores the latest data in the RAMs used as RAM1 is arranged to be used in the next SG intact as RAM1, and the remainder of the RAMs are arranged to be switched from RAM1 to RAM2.

Now, operation at the time of actual calculation will be described. In an SG located in the second from the top in FIG. 2, data stored in memories F~I where data is recorded during the previous SG duration, and data stored in memory E which is recorded in previous of the previous SG duration and used in the processing in the previous SG duration are subjected to processing. There, memories A~D functions as memories to receive and record data to be newly inputted.

When performing MDCT processing, data is read out from memories E~H and I to start the processing, and the data being processed is written into the memories E~H, maintaining the data intact in the memory I. Then, in the following SG, the data in the memory I can be used once more. Meanwhile, in the second use, data to be used is not all the data stored in the memory I, but only data of 192 samples thereof.

Meanwhile, in this example, 1 word is made to be 26 bits, and 1 sample is made to correspond to 1 word.

In this way, according to the present embodiment, memories are used by switching the function thereof at each SG. Accordingly, effective use of the memories can be provided, and MDCT processing can be performed with reduced memory capacity. Further, any special circuit is unnecessary for making access to the memories A~I (10a~10i), and the accessing circuit can be realized with a simple circuit.

Furthermore, in the present embodiment, by composing the memories 10a~10i with independent memories, respective memories are independently accessed when making access. Accordingly, a memory to be accessed can be limited to one, and the current flowing in one access can be reduced, enabling a memory device of reduced power consumption.

Moreover, although a memory device having nine discrete memories is used in the above described example, nine blocks made within a memory device by dividing thereof can also perform similar processing to that in the above description.

For the reasons stated above, according to the present invention, since a group of memories are used by being switched alternately with another group of memories, and a part of the memories is used intact without being switched, effective use of the memories can be provided.

What is claimed is:

1. A memory device in which memory capacity required for processing a predetermined quantity of data is split into a plurality of split memories to be used for processing, wherein:

said plurality of split memories include:

a first memory group which has stored data to be processed during a predetermined processing duration; and a second memory group to write into and store data being inputted during the processing duration, and split memories of said first memory group and split memories of said second memory group are alternately switched, at a time point when predetermined processing duration has passed, with at least one of said split memories of said first memory group being maintained intact.

2. A memory device according to claim 1, wherein said plurality of split memories is allocated to said first memory group in a first amount and to said second memory group in a second amount, said first amount being larder than said second amount.

3. A memory device in which memory capacity required for processing a predetermined quantity of data is split into a plurality of split memories to be used for processing, wherein:

said plurality of split memories include:

a first memory group which has stored data to be processed during a predetermined processing duration; and a second memory group to write into and store data being inputted during the processing duration, and split memories of said first memory group and split memories of said second memory group are alternately switched at a time point when predetermined processing duration has passed; said plurality of memories is allocated to said first memory group in a larger number than said second memory group; and at least one split memory of said first memory group continuously holds data even after the predetermined processing duration has passed.

\* \* \* \* \*

UNITED STATES PATENT AND TRADEMARK OFFICE
CERTIFICATE OF CORRECTION

PATENT NO.     : 6,260,122 B1
DATED          : July 10, 2001
INVENTOR(S)    : Matsui et al.

Page 1 of 1

It is certified that error appears in the above-identified patent and that said Letters Patent is hereby corrected as shown below:

Column 1,
Line 19, after "digital" delete "delta" and insert therefor -- data --

Column 3,
Line 38, after "in" delete "previous of" and insert -- an SG duration prior to --

Signed and Sealed this

Eleventh Day of January, 2005

JON W. DUDAS
*Director of the United States Patent and Trademark Office*